(12) United States Patent
Huber et al.

(10) Patent No.: US 10,794,270 B2
(45) Date of Patent: Oct. 6, 2020

(54) CONNECTING ROD FOR AN INTERNAL COMBUSTION ENGINE WITH VARIABLE COMPRESSION

(71) Applicant: ECO Holding 1 GmbH, Marktheidenfeld (DE)

(72) Inventors: David Huber, Aschaffenburg (DE); Dietmar Schulze, Muenzenberg (DE); Alexander Mudra, Marktheidenfeld (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 16/253,074

(22) Filed: Jan. 21, 2019

(65) Prior Publication Data

US 2019/0226396 A1 Jul. 25, 2019

(30) Foreign Application Priority Data

Jan. 23, 2018 (DE) .......................... 10 2018 101 440
Sep. 24, 2018 (DE) .......................... 10 2018 123 426

(51) Int. Cl.
| | | |
|---|---|---|
| *F02B 75/04* | (2006.01) | |
| *F02F 7/00* | (2006.01) | |
| *F16C 7/06* | (2006.01) | |
| *F02B 75/32* | (2006.01) | |
| *B21D 22/02* | (2006.01) | |
| *B21D 53/84* | (2006.01) | |

(52) U.S. Cl.
CPC ............ *F02B 75/045* (2013.01); *B21D 22/02* (2013.01); *B21D 53/84* (2013.01); *F02B 75/32* (2013.01); *F16C 7/06* (2013.01); *F02F 7/0043* (2013.01)

(58) Field of Classification Search
CPC ........ F02B 75/045; F02B 75/32; B21D 22/02; B21D 53/84; F16C 7/06; F02F 7/0043
USPC ....................................................... 123/48 B
See application file for complete search history.

(56) References Cited

U.S. PATENT DOCUMENTS

| | | | | |
|---|---|---|---|---|
| 4,494,286 | A * | 1/1985 | Kaufman .................. | F16C 9/04 123/197.4 |
| 4,825,717 | A * | 5/1989 | Mills ....................... | F01L 1/185 123/90.39 |
| 7,500,417 | B2 * | 3/2009 | Ogawa .................... | C22C 38/24 74/579 E |
| 9,567,901 | B2 * | 2/2017 | Schulze ................ | F02B 75/045 |
| 2004/0134065 | A1 * | 7/2004 | Kadokawa ............. | B21D 53/84 29/888.2 |
| 2017/0268420 | A1 * | 9/2017 | Jung ....................... | F16C 7/06 |

FOREIGN PATENT DOCUMENTS

DE 102013014090 A1 3/2015

* cited by examiner

*Primary Examiner* — Syed O Hasan
(74) *Attorney, Agent, or Firm* — Von Rohrscheidt Patents

(57) ABSTRACT

A connecting rod for an internal combustion engine with variable compression, the connecting rod including an eccentrical element adjustment arrangement configured to adjust an effective connecting rod length, wherein the eccentrical element adjustment arrangement includes an eccentrical element that cooperates with an eccentrical element lever and supports rods that engage the eccentrical element lever, and wherein the eccentrical element lever is integrally configured in one piece as a stamped and bent component or fabricated by a massive cold forming method.

11 Claims, 16 Drawing Sheets

(XVI)

(XVII)

CONNECTING ROD FOR AN INTERNAL COMBUSTION ENGINE WITH VARIABLE COMPRESSION

RELATED APPLICATIONS

This application claims priority from and incorporates by reference German patent applications:
DE 10 2018 101 440.6 filed on Jan. 23, 2018; and
DE 10 2018 123 426.0 filed on Sep. 24, 2018.

FIELD OF THE INVENTION

The invention relates to a connecting rod for an internal combustion engine with variable compression and to an internal combustion engine with variable compression with the connecting rod.

BACKGROUND OF THE INVENTION

In internal combustion engines a high compression ratio has a positive effect upon an efficiency of the internal combustion engine. Compression ratio is typically defined as a ratio of an entire cylinder cavity before compression to a remaining cylinder cavity after compression. In internal combustion engines with external ignition, in particular gasoline engines that have a fixed compression ratio, the compression ratio, however, may only be selected high enough so that a so-called "knocking" of the internal combustion engine is prevented during full load operations. However, for much more prevalent partial load operations of the internal combustion engine, thus for a lower cylinder charge the compression ratio can be selected at a higher level without "knocking" occurring. The important partial load operations of an internal combustion engine can be improved when the compression ratio is variably adjustable. In order to adjust the compression ratio systems with variable connecting rod length are known which actuate an eccentrical element adjustment arrangement of a connecting rod by hydraulic switch valves.

DE 10 2013 014 090 A1 describes e.g. the two piece configuration of an eccentrical element lever whose eccentrical element lever segments are connected by connecting bolts.

BRIEF SUMMARY OF THE INVENTION

It is an object of the provide an improved economical connecting rod for an internal combustion engine with variable compression that is producible in a reliable manner.

It is another object of the invention to provide a variable compression internal combustion engine with the connecting rod.

The object is achieved according to one aspect of the invention by a connecting rod for an internal combustion engine with variable compression, the connecting rod including an eccentrical element adjustment arrangement configured to adjust an effective connecting rod length, wherein the eccentrical element adjustment arrangement includes an eccentrical element that cooperates with an eccentrical element lever and supports rods that engage the eccentrical element lever, and wherein the eccentrical element lever is integrally configured in one piece as a stamped and bent component or fabricated by a massive cold forming method.

Advantageously embodiments and advantages of the invention can be derived from the dependent claims, the description and the drawing figure.

A connecting rod is proposed for an internal combustion engine with variable compression that includes an eccentrical element adjustment arrangement for adjusting an effective connecting rod length. The eccentrical element adjustment arrangement includes an eccentrical element that cooperates with an eccentrical element lever and includes support rods engaging the eccentrical element lever.

According to the invention the eccentrical element lever is integrally configured in one piece as a stamped and bent component or by a massive cold forming method.

The one piece integral fabrication of the eccentrical element lever facilitates a very economical fabrication method for the entire connecting rod assembly. Producing the eccentrical element lever can be advantageously performed in a similar manner as producing a roller cam follower of a valve assembly of an internal combustion engine. Thus, forming the stamped component can be advantageously performed by a forging process that generates a flowing of the formed material. Also a massive cold forming process can be advantageously used to produce the eccentrical element lever.

The eccentrical element lever can then be welded to the eccentrical element wherein the eccentrical element lever can only envelop the eccentrical element completely or partially on a circular arc section. A partially enveloped connection of the eccentrical element lever at the eccentrical element has proven particularly advantageous since the material and thus the weight of the eccentrical element lever can be significantly reduced. The attachment of the eccentrical element can be performed in both cases e.g. by welding wherein it has proven particularly advantageous for a partially enclosed eccentrical element when the eccentrical element lever is configured in the portion of the ends of the weld seam with a lower material thickness than in the remaining portion of the eccentrical element lever. This way a force that is introduced into the weld seam during operations of the connecting rod can be advantageously reduced. This helps to minimize a risk of fractures forming in a contact portion between the eccentrical element and the eccentrical element lever.

Thus, the eccentrical element lever can be advantageously produced as a stamped component in that initially a corresponding geometric pattern of the eccentrical element lever is punched out from sheet metal. This flat component can then be bent over at the corresponding locations with respective radii so that it assumes the desired shape of the eccentrical element lever. Processing steps like introducing bore holes or particular shapes like receiver portions for the joints support rods can still be performed in the initial condition where the sheet metal is flat or after the forming process. This way the eccentrical element lever can be produced with the desired tolerance in a cost effective manner.

Also using a massive cold forming method the eccentrical element lever can be fabricated as a one piece welded component in a simple and cost effective manner.

High strength heat treatable steel can be used for example for the eccentrical element lever, wherein the heat treatment process can be performed before or after forming.

According to an advantageous embodiment at least one portion of the eccentrical element lever can be subjected to at least one direction change in the forming process. In particular two end portions of the punched out shape of a sheet metal component can be folded over in a suitable manner in order to provide e.g. side lobes of an eccentrical element lever.

According to an advantageous embodiment at least a portion of the eccentrical element lever can have at least two forming radii, in particular in planes that are arranged at a slant angle relative to each other. Thus, also more complex shapes of an eccentrical element lever can be formed from a simple flat stamped sheet metal element. For example only side lobes of an eccentrical element lever can be folded with a forming radius. Thereafter shoulders can be provided in order to be able to receive and retain for example a ball joint of a support rod.

According to an advantageous embodiment the eccentrical element lever can include at least one loss prevention safety which secures the support rods against falling out of the eccentrical element lever. In particular the eccentrical element lever can include bore holes that can receive a safety pin that can support the support rods against falling out of the joint portion. Alternatively portions of the eccentrical element lever can be crimped or provided with shoulders after inserting the ball joint of a support rod so that the ball joint is secured against sliding out of the joint portion.

According to an advantageous embodiment the eccentrical element lever can include joint receivers which engage ball joints of the support rods. Advantageously joint receivers can be introduced into the one piece eccentrical element lever e.g. by embossing or welding so that a ball joint of the support rod can be received. This way no additional component is required as a joint receiver which simplifies production of the eccentrical element lever and makes it more economical.

According to an advantageous embodiment the joint receivers can be configured as an embossing in the eccentrical element lever. In particular a stamped component can be embossed in a simple manner so that a joint receiver can be implemented which can receive e.g. a ball joint of the support rod. In particular sheet metal components as they are used for stamped components are particularly suited for an embossing process of this type.

According to an advantageous embodiment the joint receivers can be configured as spherical sections. Advantageously ball joints are used as joints by which the support rods are movably connected with the eccentrical element lever. Ball joints of this type can be suitably received in the ball joints receivers that are shaped as spherical sections. Thus, the free movability of the support rod in plural sections in space can be advantageously implemented.

According to an advantageous embodiment the at least one loss safety can include crimped over lobes which at least partially envelop the ball joints of the support rods. This way the ball joints can be enveloped at least in portions in a type of cage by the crimped over lobes so that the support rods cannot fall out of the receiver. The crimping can be advantageously performed after inserting the ball joints into the respective receivers of the eccentrical element lever.

According to an advantageous embodiment the at least one loss safety can include lobes with elbows into which the ball joints of the support rods are insertable. Alternatively lobes can also be provided that are already provided with shoulders wherein the lobes envelop at least portions of the ball heads of the support rods so that the support rods cannot fall out of the receiver. The shoulders are advantageously provided so that the ball joints are advantageously insertable into the receivers when a corresponding opening is provided in the shoulder of the lobes.

According to an advantageous embodiment the eccentrical element lever can include recesses to provide weight savings and reduce tensions. Advantageously the eccentrical element lever can be configured so that the required mechanical strength is provided, and material is being saved at locations that do not contribute to strength. This way a light eccentrical element lever can be advantageously provided which does not only reduce weight of the connecting rod but which is also movable more quickly due to reduced inertia.

According to an advantageous embodiment a connecting rod eye and the eccentrical element can include first portions with first face contours and second portions with second face contours wherein the eccentrical element lever envelops the eccentrical element exclusively in a first portion of the eccentrical element. Connecting the eccentrical element only in the first portion at the eccentrical element lever simplifies mounting the connecting rod. Furthermore cost of fabricating the eccentrical element adjustment arrangement can be reduced due to reduced material consumption and simplification of the fabrication process.

According to an advantageous embodiment the eccentrical element lever can have connection sections that are parallel to each other and that are connected torque proof with the eccentrical element. The parallel connection sections favor a stable configuration of the eccentrical element lever and thus advantageously contribute to the long term strength of the eccentrical element adjustment arrangement.

According to an advantageous embodiment the connection sections can have a cambered inner surface which is configured as a circular arc segment and which envelops the first portion. Thus, an eccentrical element with a circular external shape can be advantageously connected with the eccentrical element lever. This way an advantageous force transmission can be performed from the eccentrical element lever to the eccentrical element.

According to an advantageous embodiment the inner surface can include a circular arc section that is configured semicircular at the most. The at the most semicircular embodiment of the eccentrical element lever facilitates advantageous installation space utilization in the connecting rod and facilitates advantageous force transmission from the eccentrical element lever to the eccentrical element.

According to an advantageous embodiment the eccentrical element lever can be provided welded together with the inner surface of the eccentrical element. The fixed connection of the eccentrical element lever at the eccentrical element can be advantageously provided by a welding process. This way advantageous fabrication costs can be combined with an advantageous long term strength of the eccentrical element adjustment arrangement.

According to another aspect of the invention an internal combustion engine with at least one connecting rod is proposed. Thus, advantageously a connecting rod can be used that is configured as described supra in order to advantageously implement an eccentrical element adjustment arrangement and an advantageous combustion process and low fuel burn in the internal combustion engine.

BRIEF DESCRIPTION OF THE DRAWINGS

Further advantages can be derived from the subsequent description of an advantageous embodiment with reference to drawing figures, wherein.

DETAILED DESCRIPTION OF THE INVENTION

Figure 1:
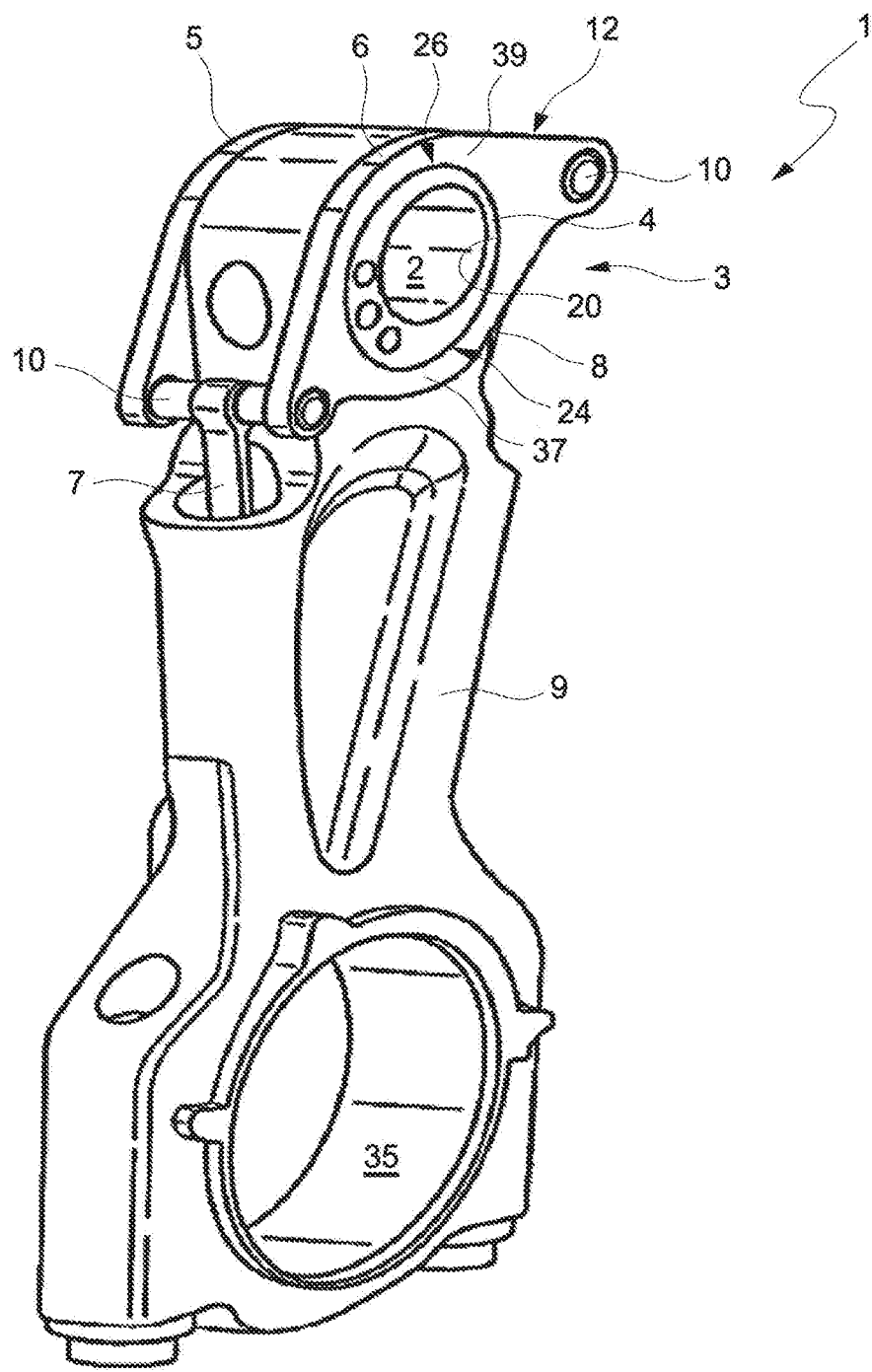
FIG. 1 illustrates an isometric view of a known connecting rod for an internal combustion engine with variable compression.

In the drawing figures identical or like components are designated with identical reference numerals. According to an advantageous embodiment the eccentrical element lever. The drawing figures merely illustrate exemplary embodiments and do not limit the spirit and scope of the invention, FIG. 1 illustrates a known connecting rod 1 for an internal combustion engine with variable compression. The connecting rod 1 includes an upper wrist pin bearing eye 2 into which a risk pin is inserted that is not illustrated in detail. The wrist pin is firmly inserted into the combustion chamber piston of the internal combustion engine in a typical manner. The wrist pin bearing eye 2 is pivotable by an eccentrical element adjustment arrangement 3 about a pivot axis that is oriented parallel offset to the longitudinal axis of the wrist pin bearing eye 2. Thus, it is possible to adjust the wrist pin bearing eye 2 with respect to its distance from a center axis of the crank bearing 35. This facilitates implementing a variable compression of the combustion chamber of the internal combustion engine.

An adjustment travel of the eccentrical element adjustment arrangement 3 which includes a multi-component eccentrical element lever 12 including two eccentrical element lever segments 5, 6 and an eccentrical element 4 that cooperates with the eccentrical element lever 12 and that is supported in a connecting rod bearing eye 20 of the eccentrical element lever is adjustable by a switch valve that is not illustrated.

A rotation of the adjustable eccentrical element adjustment arrangement 3 is initiated by am impact of mass and load forces of the internal combustion engine that act upon the eccentrical element adjustment arrangement 3 during an operating stroke of the internal combustion engine. Effective directions of forces acting upon the eccentrical element adjustment arrangement 3 change continuously during an operating stroke. The rotating movement or adjustment movement is supported by one or plural pistons that are loaded with hydraulic fluid in particular with motor oil, integrated in the connecting rod 1 and not illustrated or the pistons prevent a resetting of the eccentrical element adjustment arrangement 3 due to varying force effective directions of forces impacting the eccentrical element adjustment arrangement 3.

The pistons are respectively movably supported in a cylinder bore hole of a hydraulic cylinder of a connecting rod body 9 of the connecting rod 1 and connected with support rods (eccentrical element rods) 7, 8 which are in turn pivotably linked at the eccentrical element lever segments 5, 6 by cylindrical bolts 10.

Three embodiments of an eccentrical element lever 12 of a connecting rod 1 according to the invention can be derived from FIGS. 2-17.

According to the invention it is provided that the eccentrical element lever 12 is integrally configured as a stamped and bent component or produced by a massive cold forming method.

Figure 2:
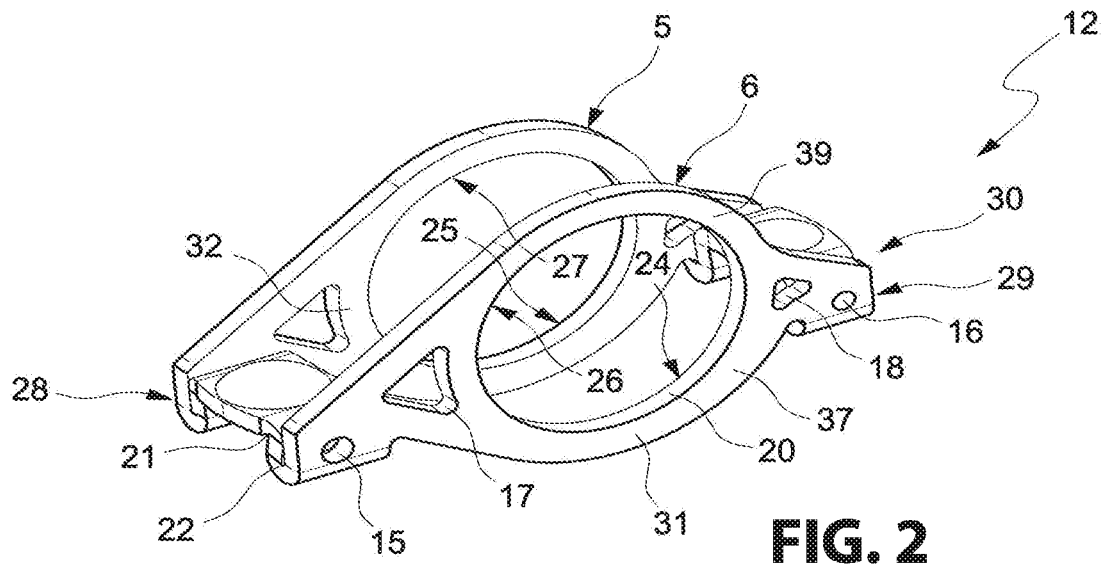
FIG. 2 illustrates an isometric view of a connecting according to an embodiment of the invention.
Figure 3:
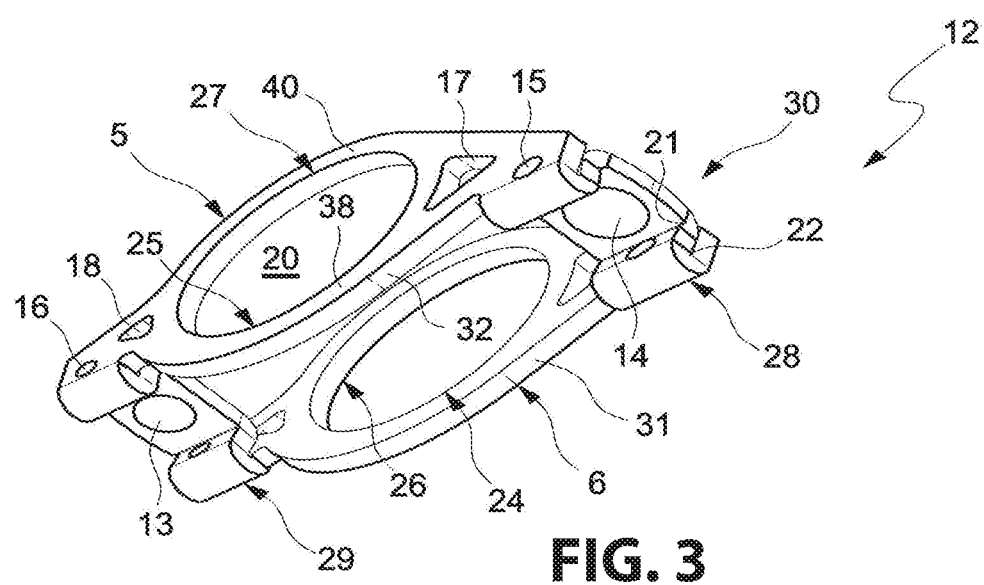
FIG. 3 illustrates an isometric view from a bottom side of the eccentrical element lever according to FIG. 2.
Figure 4:
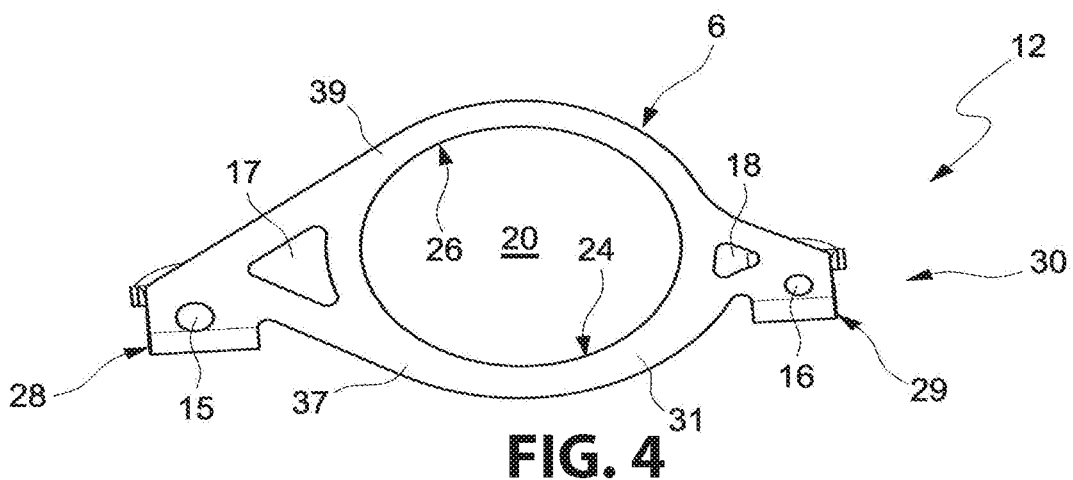
FIG. 4 illustrates a side view of the eccentrical element lever according to FIG. 2.
Figure 5:
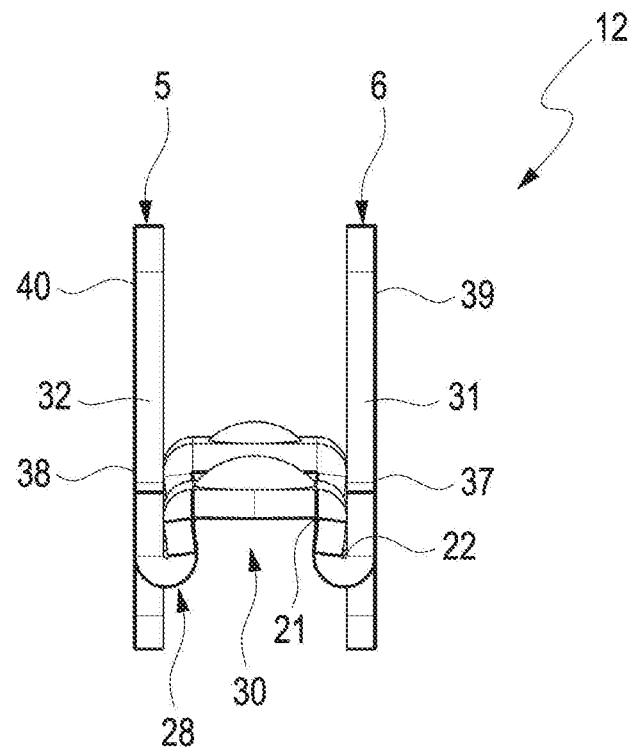
FIG. 5 illustrates a front view of the eccentrical element lever according to FIG. 2.
Figure 6:
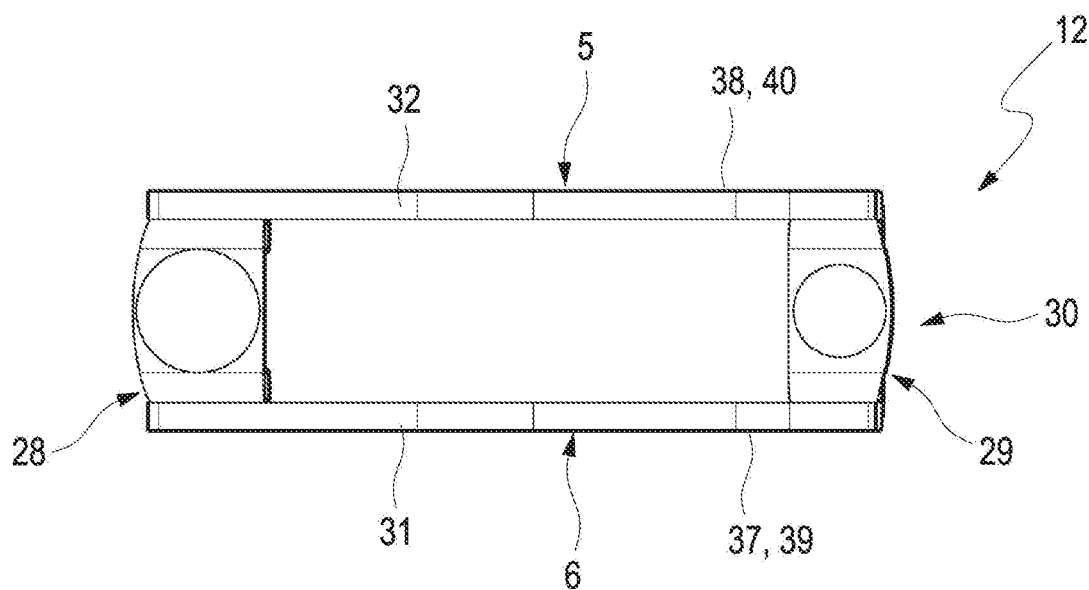
FIG. 6 illustrates a top view of the eccentrical element lever according to FIG. 2.

FIG. 2 illustrates an isometric view of an eccentrical element lever 12 according to a first embodiment of the invention whereas FIG. 3 illustrates an isometric view from a bottom side, FIG. 4 illustrates a side view of the eccentrical element lever, FIG. 5 illustrates a front view and FIG. 6 illustrates a top view of the eccentrical element lever.

FIGS. 2-6 illustrate various views of the eccentrical element lever 12 configured as a stamped and bent component. Joint receivers configured as spherical shell sections that are engaged by ball joints of the eccentrical element rods 7, 8 are embossed in the eccentrical element lever 12 without chipping fabrication and advantageously calibrated.

The eccentrical element lever 12 includes a loss safety 30 which secures the support rods 7, 8 against falling out of the eccentrical element lever 12. A wrist pin solution can be provided as a loss prevention safety 30 as indicated by the openings 15, 16. Alternatively lobes can be formed at the eccentrical element lever 12 wherein the lobes are bent over or crimped after insertion of the eccentrical element levers 7, 8 and thus respectively envelop the ball head of the eccentrical element rod 7, 8 at least partially. As an additional alternative the loss prevention safety 30 can include lobes with elbows into which the ball joints of the support rods 7, 8 are insertable.

As evident e.g. from FIG. 2 and FIG. 4 the eccentrical element lever 12 can include recesses 17, 18 in order to save weight and reduce stress.

The eccentrical element lever 12 includes connection sections 31, 32 that are parallel to each other and that are connected torque proof with the non-illustrated eccentrical element 4. The eccentrical element lever segment 5 thus includes the connection section 32 whereas the eccentrical element lever segment 6 includes the connection section 31. The eccentrical element 4 can be welded together e.g. with the connecting rod bearing eye 20 of the eccentrical element lever 12.

In the eccentrical element lever 12 the connecting rod bearing eye 20 and the non-illustrated eccentrical element 4 include first portions 24, 25 with first face contours 37, 38 and second portions 26, 27 with second face contours 39, 40, wherein the eccentrical element lever 3 envelopes the eccentrical element 4 in both portions 24, 25 and 26, 27 of the eccentrical element 4.

FIG. 7-11 illustrate another embodiment of a one piece eccentrical element lever 12 which is configured as a stamped and bent component.

Figure 7:
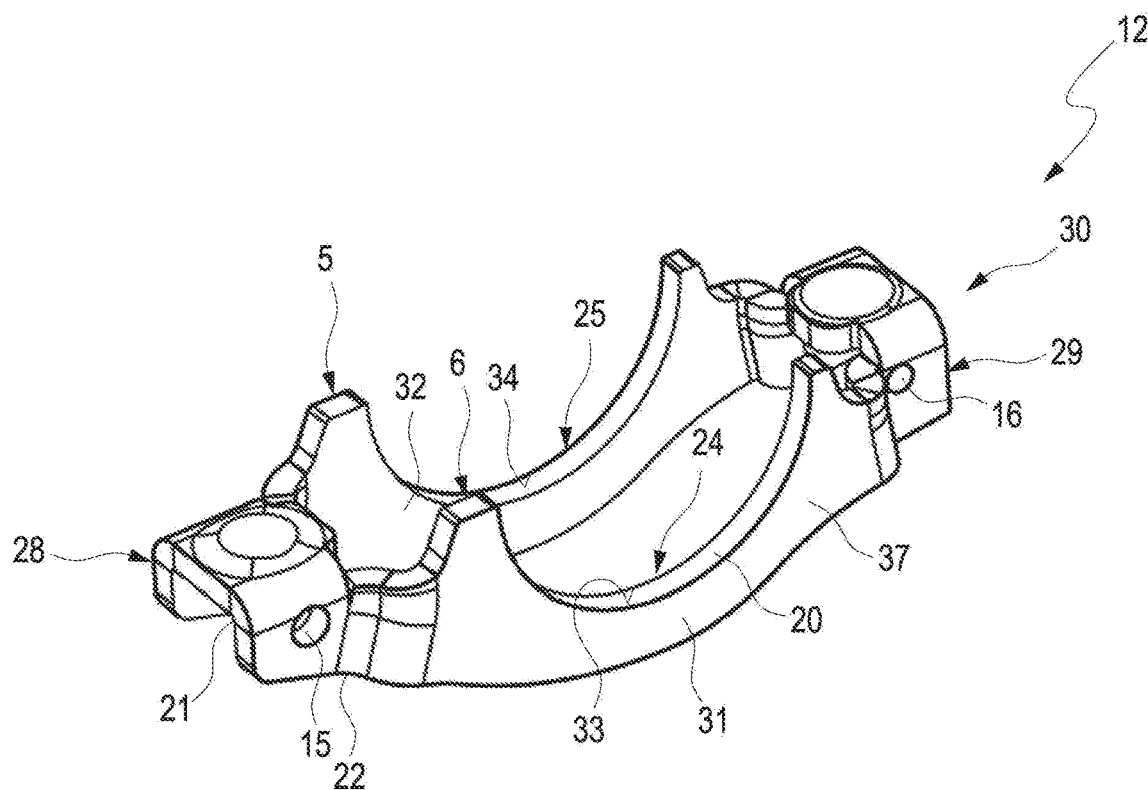
FIG. 7 illustrates an isometric view of an eccentrical element lever according to another embodiment of the invention.
Figure 8:
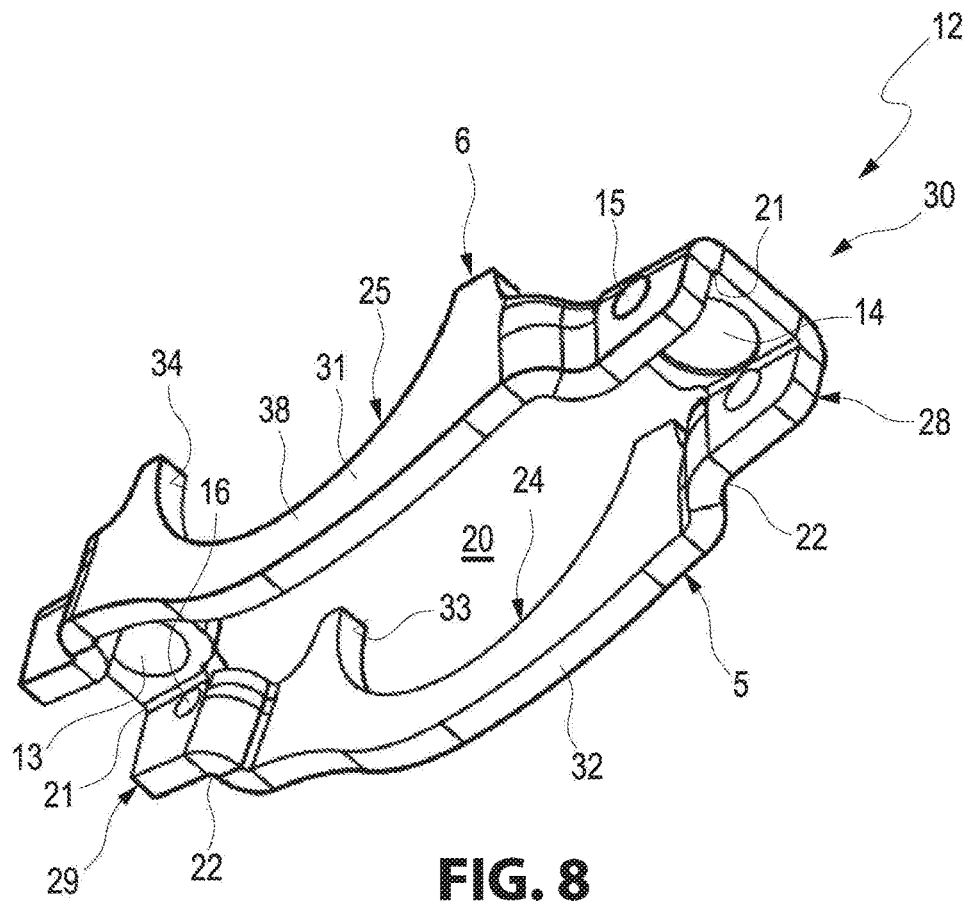
FIG. 8 illustrates an isometric view of the eccentrical element lever according to FIG. 7 from a bottom side.
Figure 9:
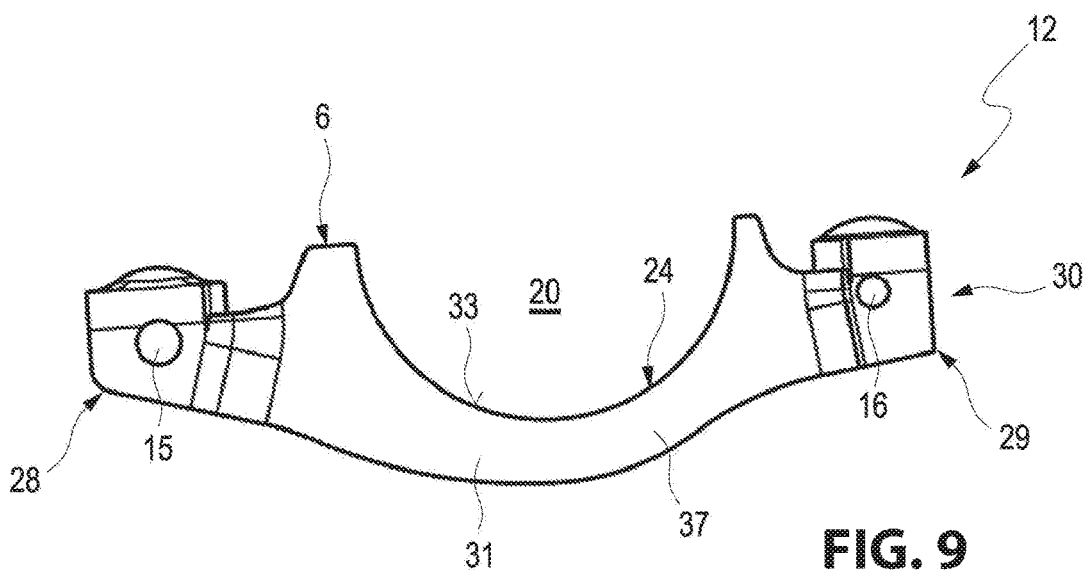
FIG. 9 illustrates a side view of the eccentrical element lever according to FIG. 7.
Figure 10:
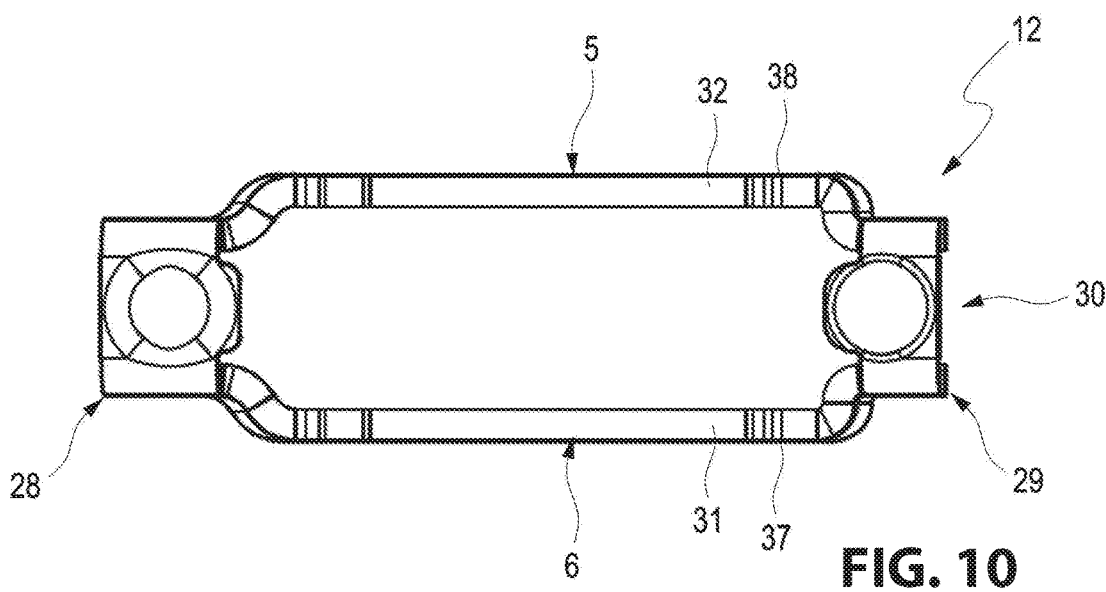
FIG. 10 illustrates a front view of the eccentrical element lever according to FIG. 7.
Figure 11:
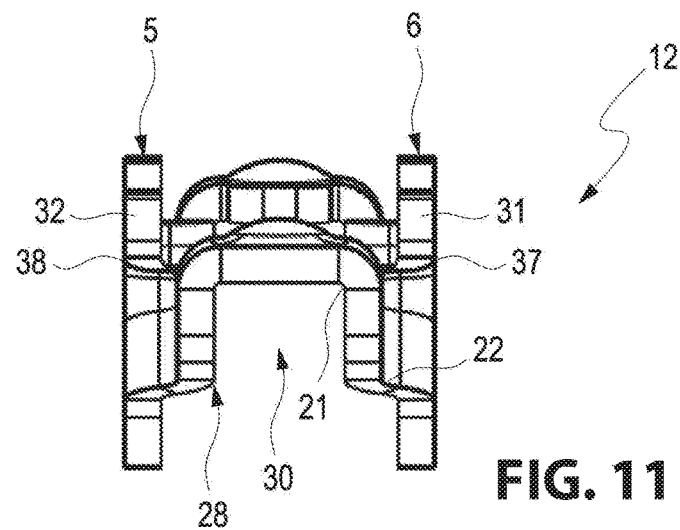
FIG. 11 illustrates a top view of the eccentrical element lever according to FIG. 7.

FIG. 7 illustrates an isometric view of the eccentrical element lever 12, whereas FIG. 8 illustrates an isometric view, FIG. 9 illustrates a side view, FIG. 10 illustrates a front view and FIG. 11 illustrates a top view of the eccentrical element lever 12 according to FIG. 7.

Differently from the previously described embodiment it is provided that the connecting rod bearing eye and the non-illustrated eccentrical element 4 include first portions 24, 25 with first face contours 37, 38 and second portions 26, 27 with second face contours 39, 40, wherein the eccentrical element lever 3 envelopes the eccentrical element 4 in this embodiment exclusively in the first portion 24, 25 of the eccentrical element 4.

The eccentrical element lever 12 includes connection sections 31, 32 that are parallel to each other and that are connected torque proof with the non-illustrated eccentrical element 4. The connection sections 31, 32 include a cambered inner surface 33, 34 which is configured as a circular arc segment and which envelops the first portion 24, 25. The inner surface 33, 34 includes a circular arc segment that is configured as a semi-circle at the most. The eccentrical element lever 3 can be advantageously welded to the eccentrical element 4 along the inner surface 33, 34.

Advantageously the connection sections 31, 32 can be configured thinner in a portion of ends of the weld seam when connecting an eccentrical element 4, than in other portions of the connection sections 31, 32 in order to keep the load that is caused in an end portion of the weld seam by the force introduction small. Thus, a risk of a fracture forming in the weld seam can be reduced.

A third embodiment can be derived from FIGS. 12-17 which shows a single piece eccentrical element lever 12 configured as an investment cast component.

Figure 12:
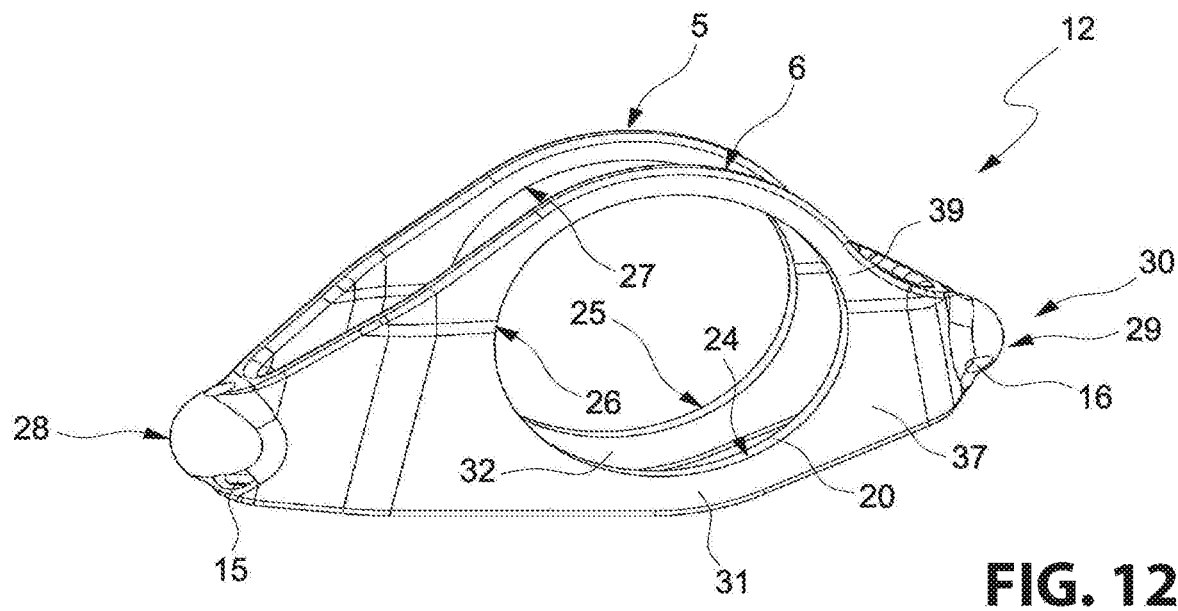
FIG. 12 illustrates an isometric view of the eccentrical element lever according to another embodiment of the invention.
Figure 13:
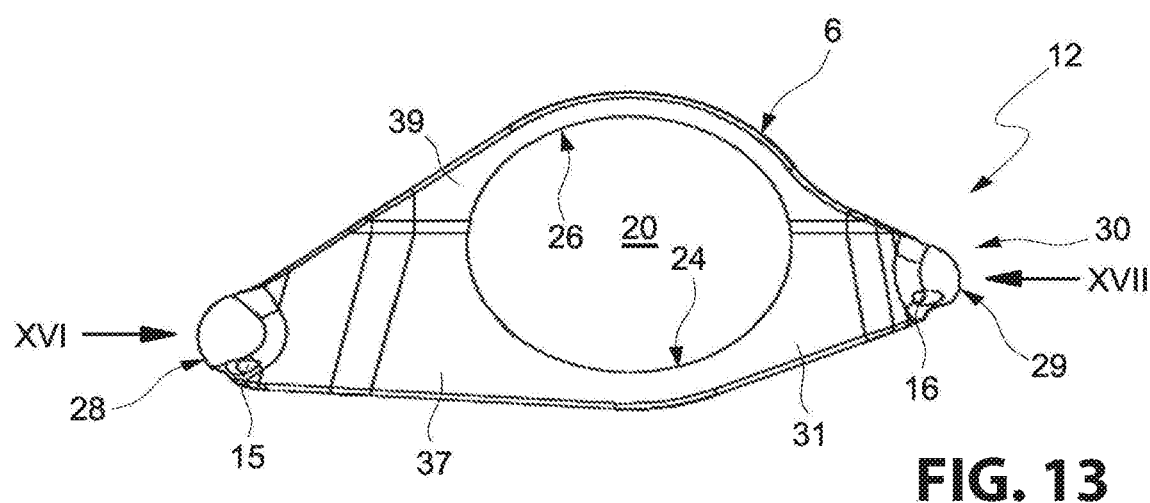
FIG. 13 illustrates a side view of the eccentrical element lever according to FIG. 12.
Figure 14:
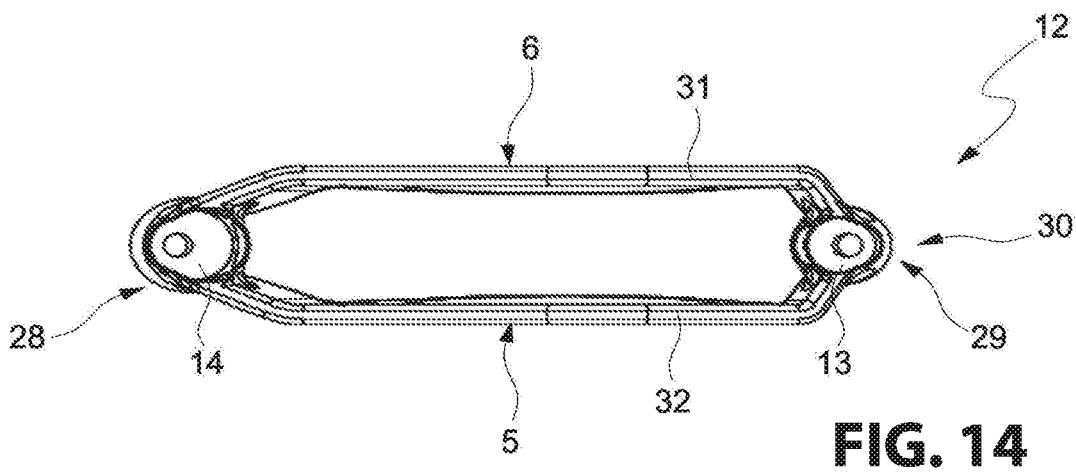
FIG. 14 illustrates a bottom view of the eccentrical element lever according to FIG. 12.
Figure 15:
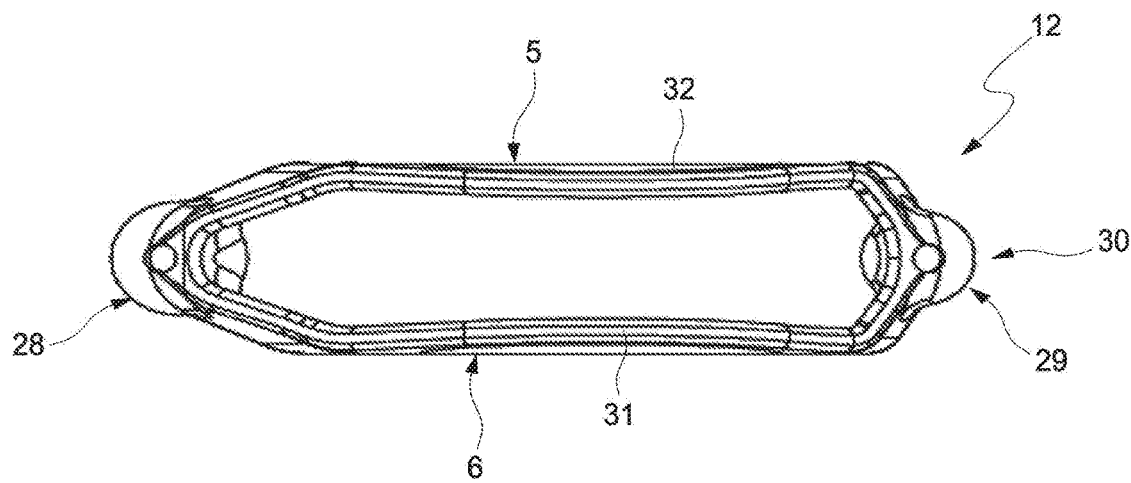
FIG. 15 illustrates a top view of the eccentrical element lever according to FIG. 12.
Figure 16:
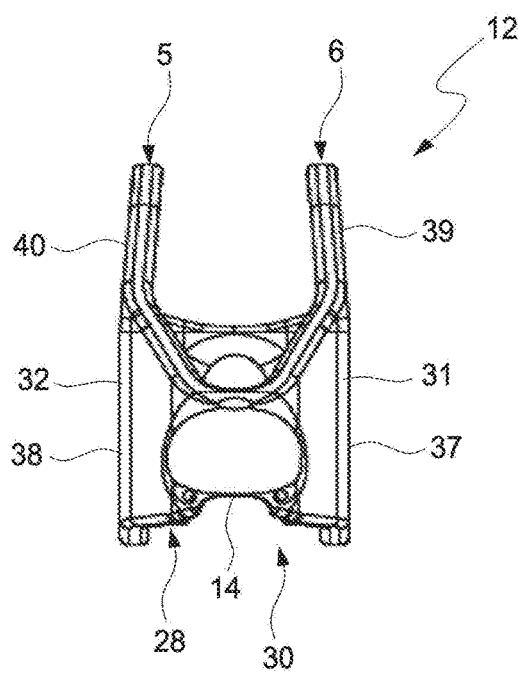
FIG. 16 illustrates a front view in the direction XVI of the eccentrical element lever according to FIG. 13.
Figure 17:
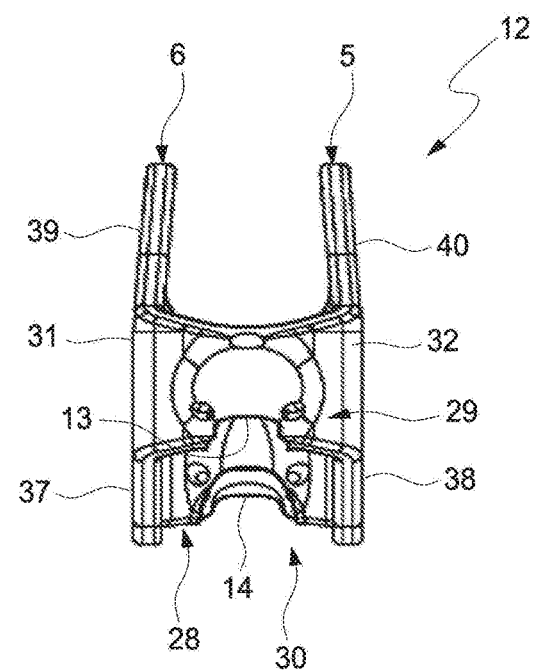
FIG. 17 illustrates a front view in the direction XVII of the eccentrical element lever according to FIG. 13.

FIG. 12 illustrates an isometric view of the eccentrical element lever 12, whereas FIG. 13 illustrates a side view, FIG. 14 illustrates a view from a bottom side of the eccentrical element lever 12, FIG. 15 illustrates a top view of the eccentrical element lever 12, FIG. 16 illustrates a front view from the direction XVI of the eccentrical element lever 12 according to FIG. 13 and FIG. 17 illustrates a front view from the direction XVII of the eccentrical element lever according to FIG. 13.

Also in this embodiment the eccentrical element lever 12 is implemented as a component that is fabricated integrally in one piece. It is evident that also this embodiment includes a non-symmetrical eccentrical element lever 12 which is structurally optimized with respect to forces that impact it during operations of the internal combustion engine. Transversal bore holes configured as openings 15, 16 for receiving loss prevention safeties e.g. provided as safety pins are arranged in the eccentrical element lever 12 in the portions of the joint receivers 13, 14 (c.f. FIG. 14).

In the bottom view in FIG. 14 the two joint receivers 13, 14 are shown which are also at least visible in the two front views in FIGS. 16, 17 from various sides of the eccentrical element lever 12.

Alternative embodiment provide that the one piece eccentrical element lever 12 is produced by a massive cold forming process or as a laser cut and subsequently bent component.

FIGS. 18-35 illustrate an eccentrical element lever 12 that is fabricated as a stamped and bent component which corresponds to the embodiment illustrated in FIGS. 7-11 in various fabrication steps.

Figure 18:
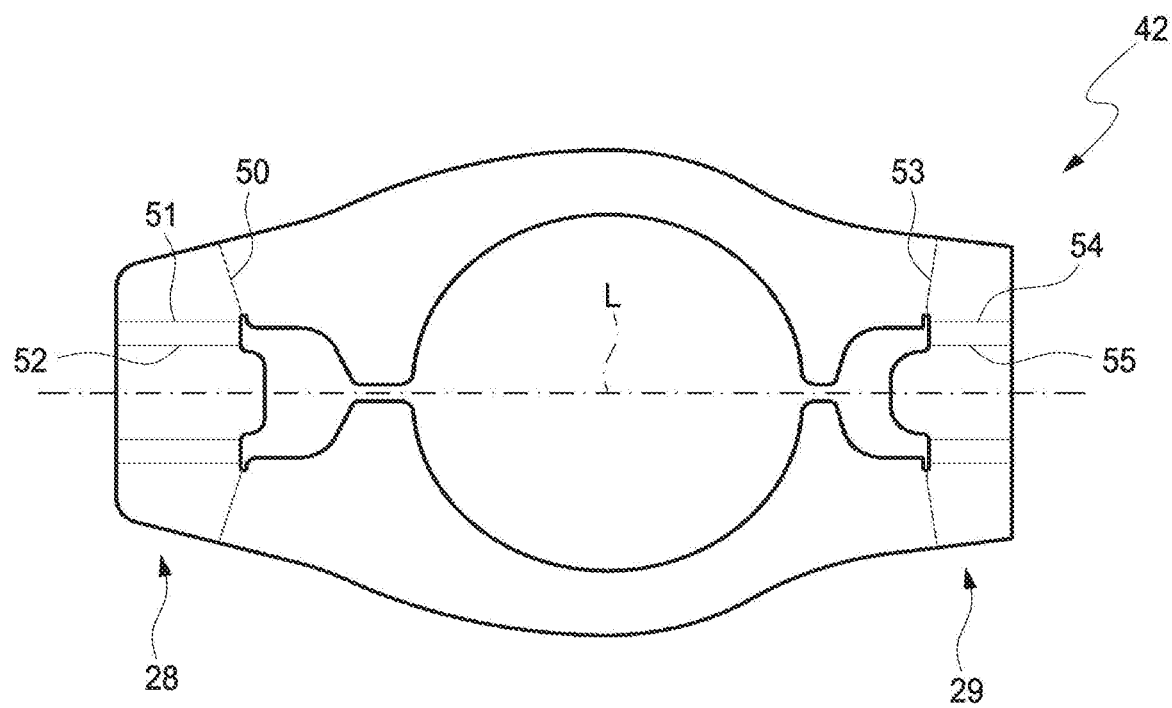
FIG. 18 illustrates a top view of a punched out blank of an eccentrical element lever according to FIG. 7.
Figure 19:
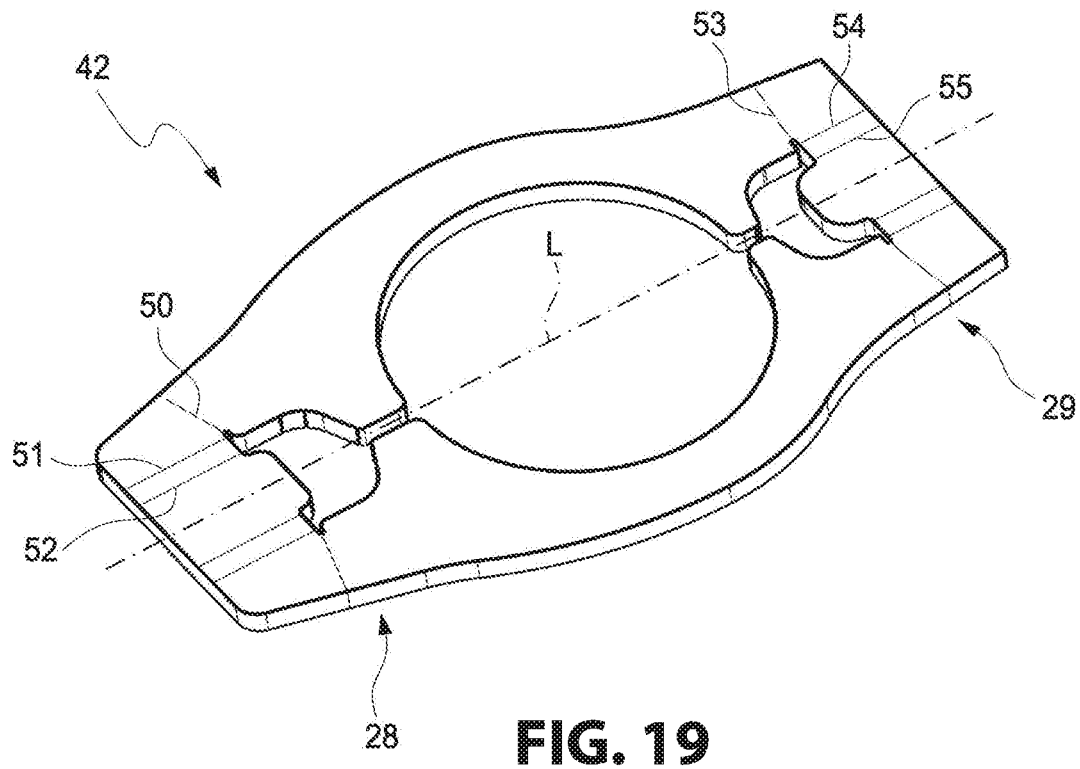
FIG. 19 illustrates an isometric view of the punched out blank according to FIG. 18.

FIG. 18 illustrates a top view of the stamped blank 42 of an eccentrical element lever 12 that is illustrated e.g. in FIGS. 7-11 in a finished condition. The blank 42 can be configured e.g. as a stamped sheet metal component. High strength case hardened steel can be used for example for a material of the eccentrical element lever 12, wherein the hardening can be performed before or after the forming. FIG. 19 illustrates an isometric view of the stamped blank 42.

FIG. 18 illustrates the flat stamped blank 42 configured as a sheet metal component with indicated creasing lines 50, 51, 52, 53, 54, 55. The creasing lines 50, 51, 52, 53, 54, 55 are respectively arranged symmetrical to a symmetry axis L of the blank 42. The blank 42 is creased in subsequent bending processes along these predetermined creasing lines 50, 51, 52, 53, 54, 55 into the desired shape of the eccentrical element lever 12. Thus, at least a portion 28, 29 of the eccentrical element lever 12 is at least subjected to a directional change during the forming process. The portions 28, 29 can also be advantageously subjected to plural directional changes during the forming process as indicated in the illustrated embodiment. The portions 28, 29 of the eccentrical element lever 12 include at least two different forming radii 21, 22, in particular in planes that are arranged at a slant angle relative to each other.

The creasing lines 50, 51, 52, 53, 54, 55 can be configured pre-embossed in order to facilitate the creasing process.

Figure 20:
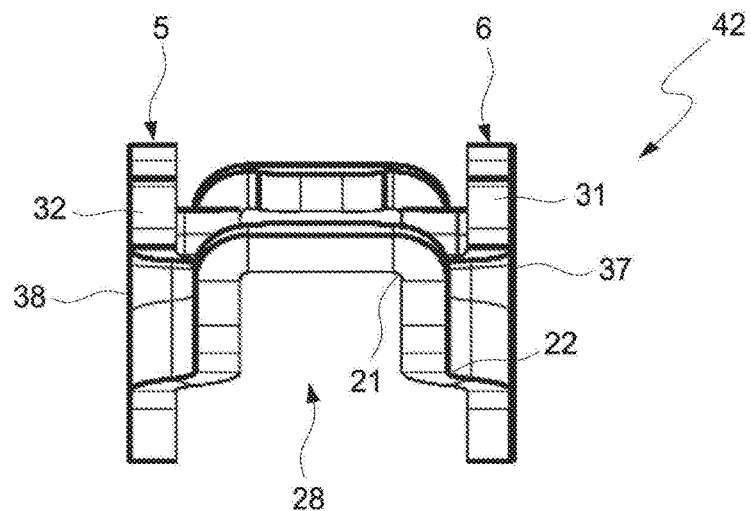
FIG. 20 illustrates a front view of the blank according to FIG. 18 after a bending process.
Figure 21:
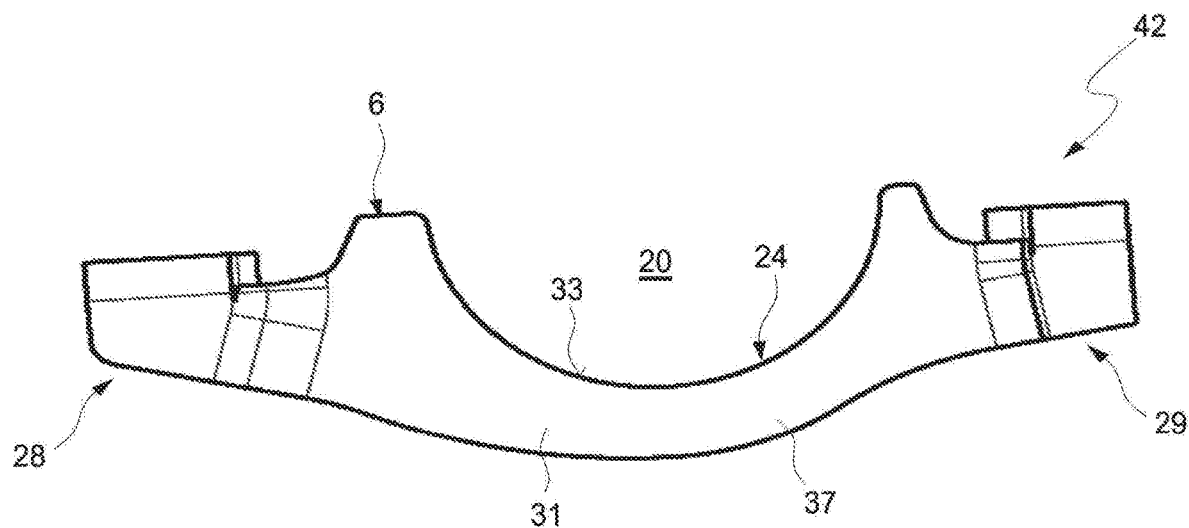
FIG. 21 illustrates a side view of the blank according to FIG. 18 after the bending process.
Figure 22:
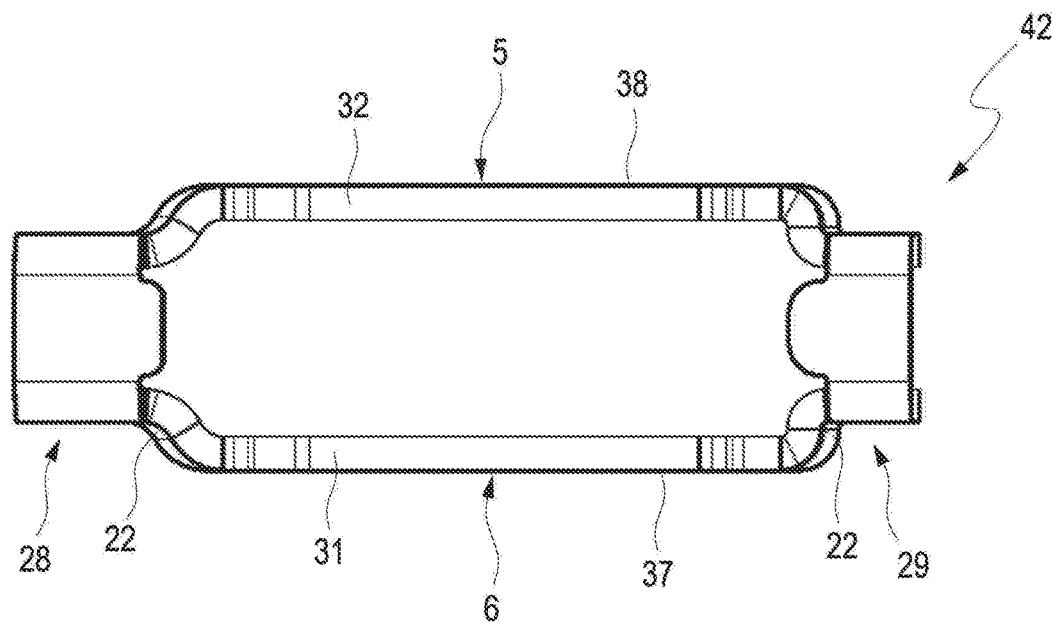
FIG. 22 illustrates a top view of the blank according to FIG. 18 after the bending process.
Figure 23:
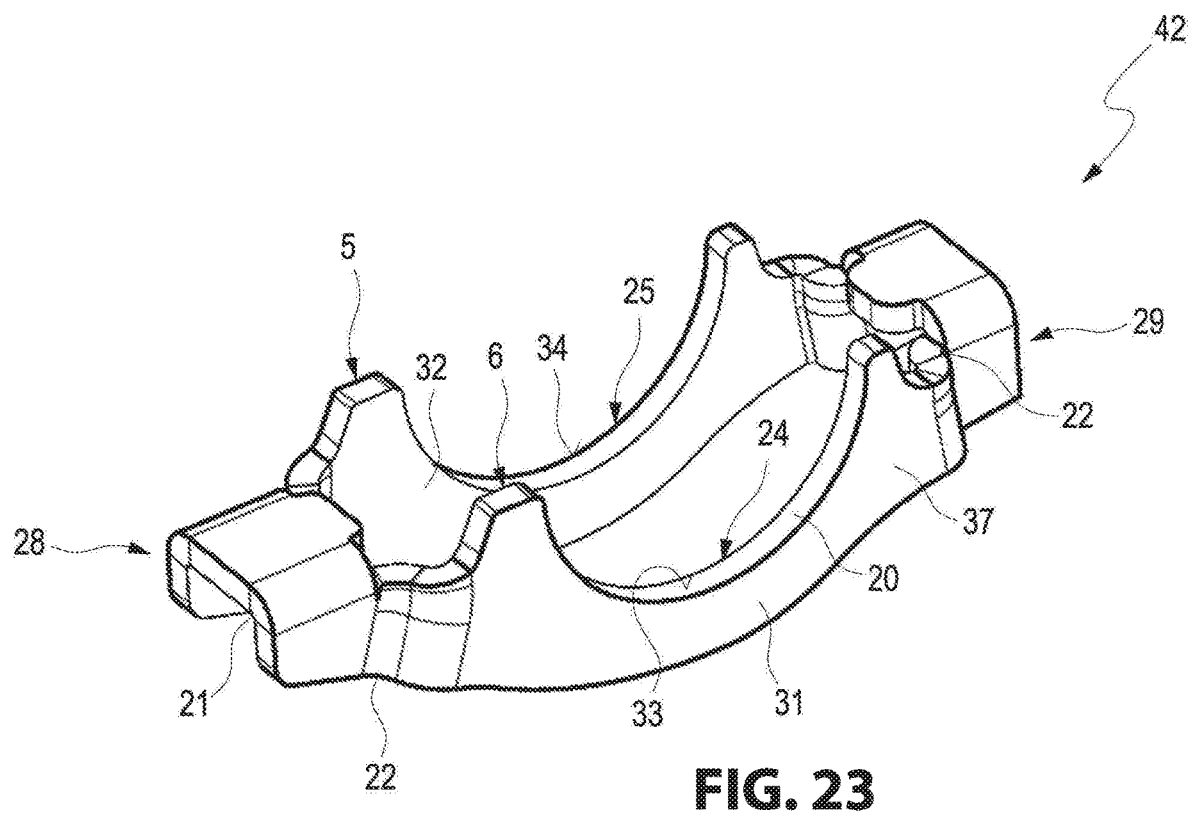
FIG. 23 illustrates an isometric view of the blank according to FIG. 18 after the bending process.

FIG. 20 illustrates a front view of the blank 42 according to FIG. 18 after the bending process, whereas FIG. 21 illustrates a side view, FIG. 22 illustrates a top view, and FIG. 23 illustrates an isometric view after the creasing process.

After the creasing process the blank 42 is already brought into the desired shape of the eccentrical element lever and can then be processed further.

Figure 24:
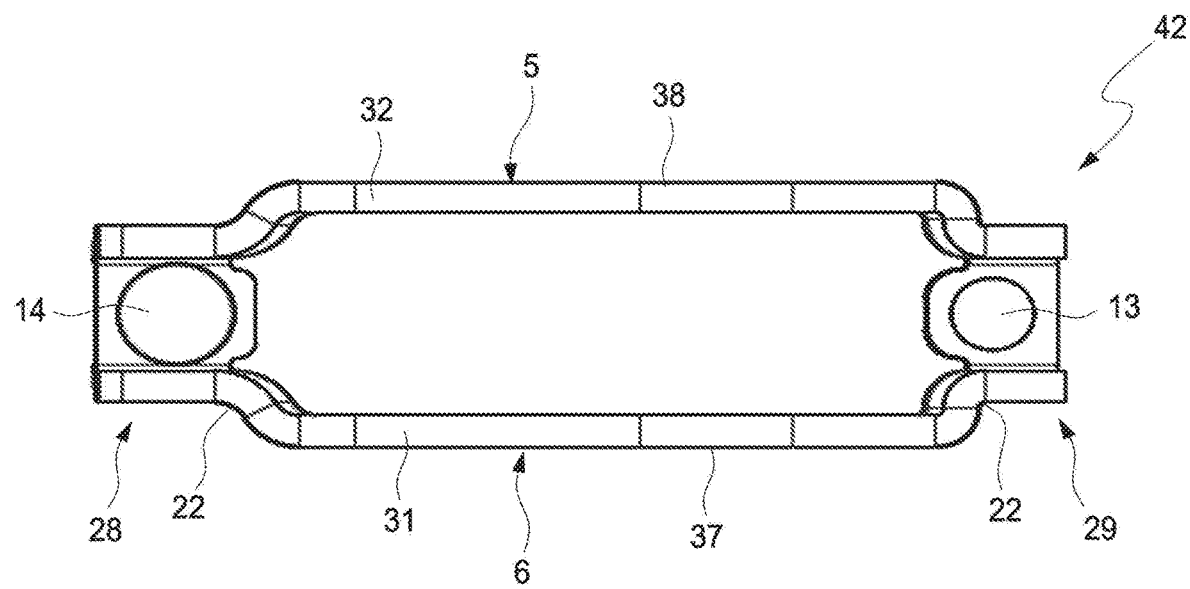
FIG. 24 illustrates a bottom view of the blank according to FIG. 18 after the bending process and subsequent embossing of joint receivers.
Figure 25:
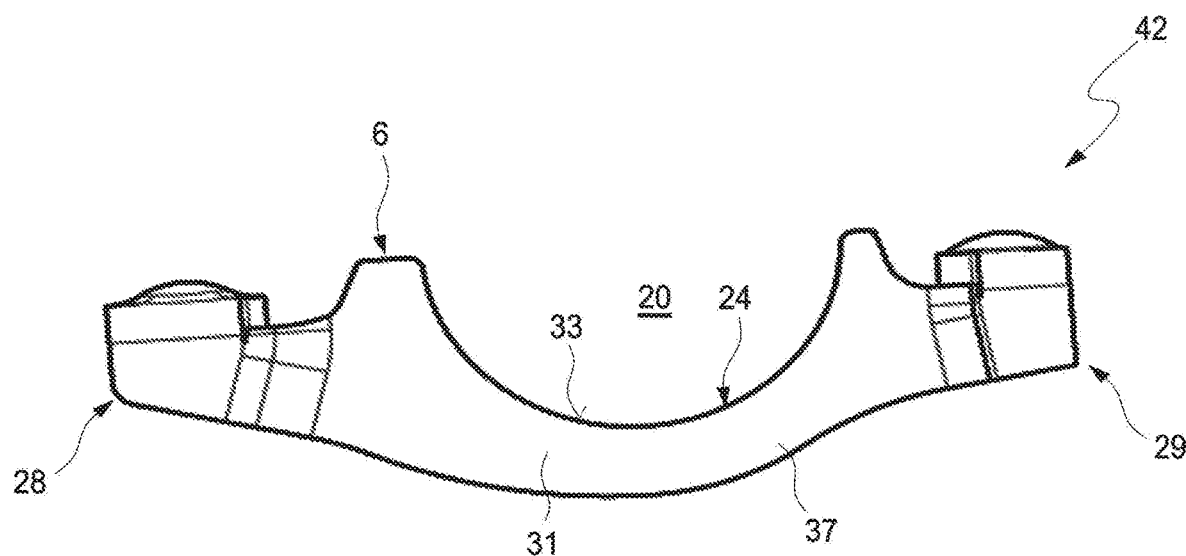
FIG. 25 illustrates a side view of the blank according to FIG. 24.
Figure 26:
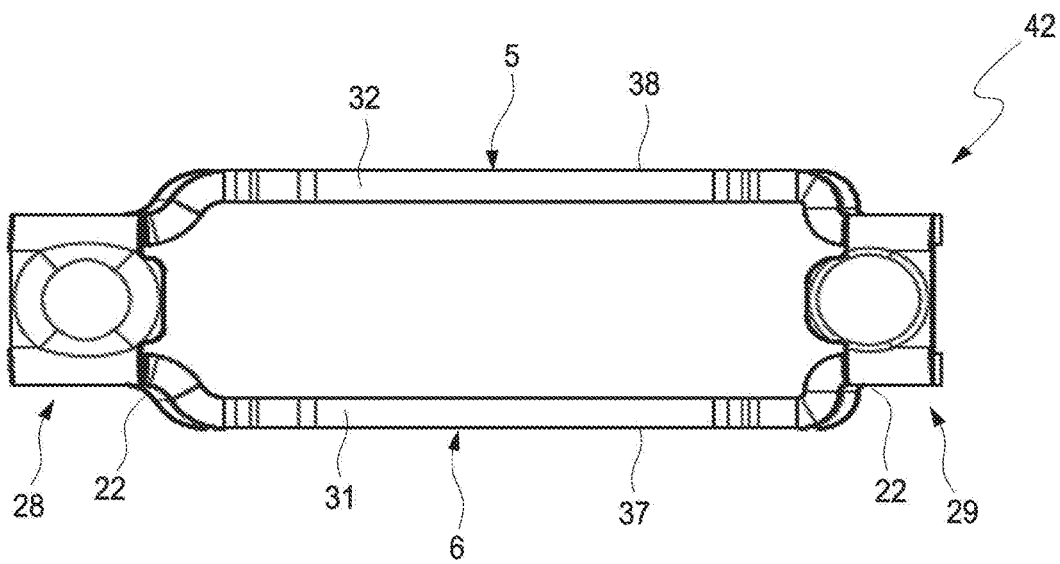
FIG. 26 illustrates a top view of the blank according to FIG. 24.
Figure 27:
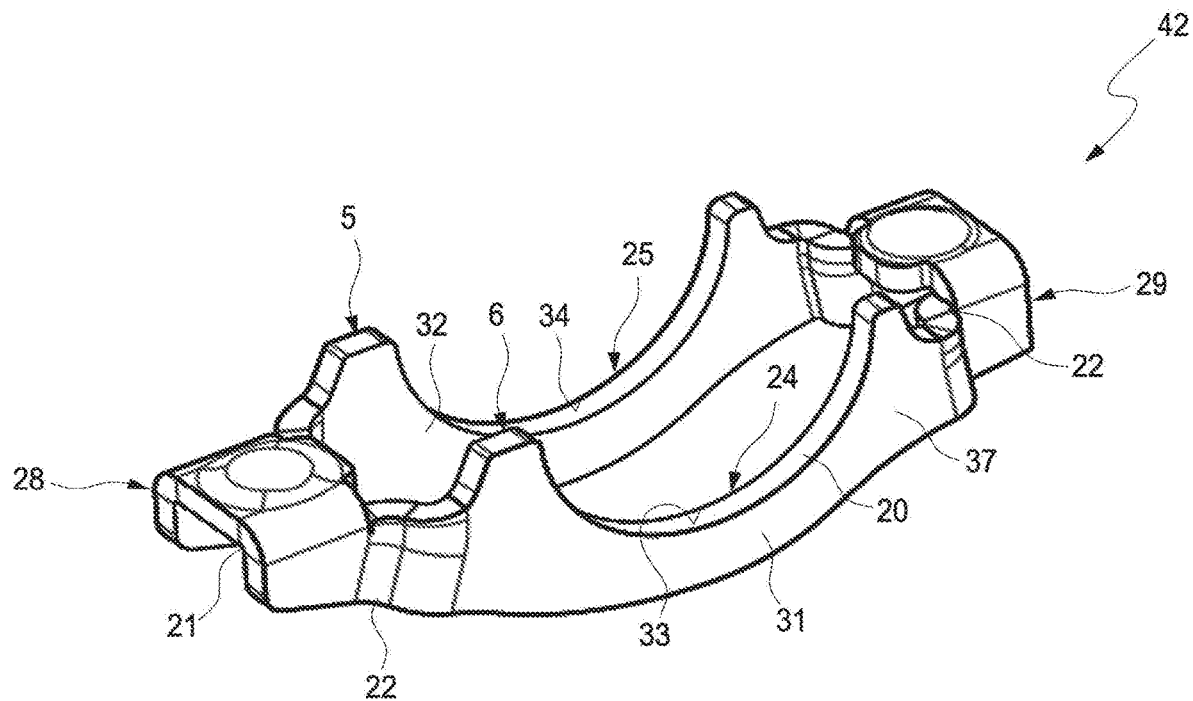
FIG. 27 illustrates an isometric view of the blank according to FIG. 24.
Figure 28:
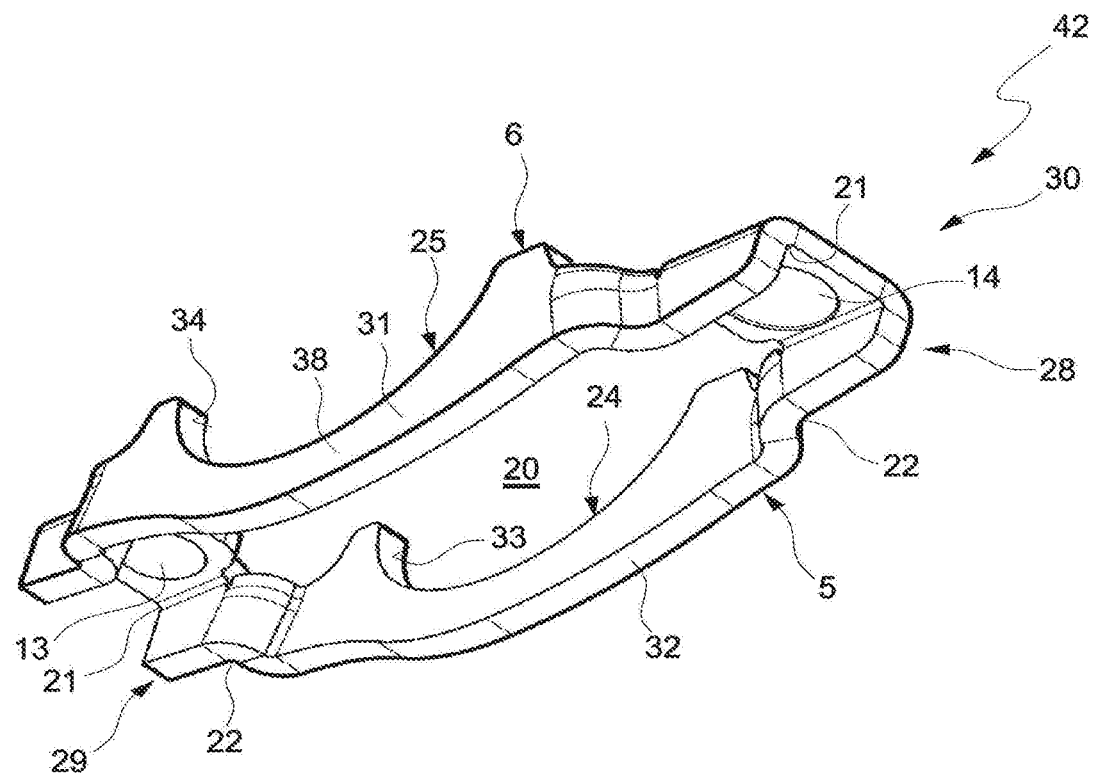
FIG. 28 illustrates an isometric view of a bottom side of the blank according to FIG. 24.
Figure 29:
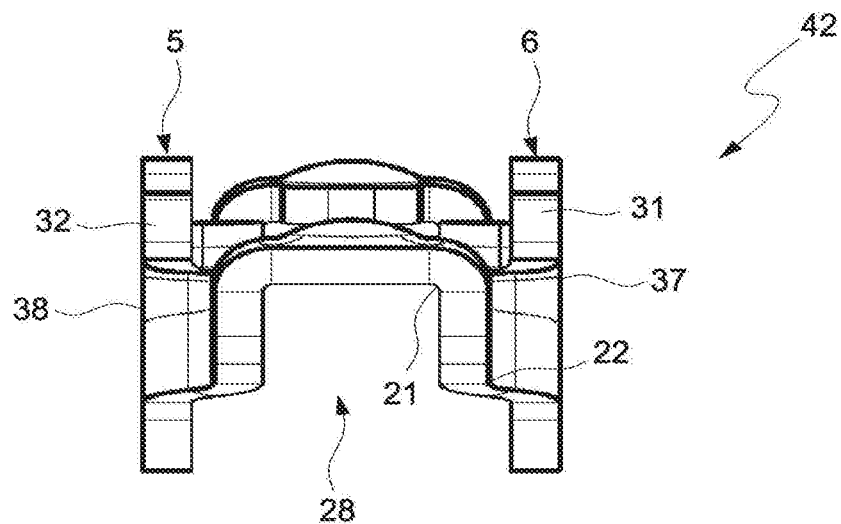
FIG. 29 illustrates a front view of the blank according to FIG. 24.

FIG. 24 illustrates a bottom view of the blank 42 according to FIG. 18 after the creasing process and subsequent embossing of joint receivers. FIGS. 25-29 illustrate different views of the blank 42 in this condition.

The joint receivers 13, 14 are embossed from a bottom side of the blank 42 into the blank 42 as spherical shell sections. Therefore the two joint receivers 13, 14 are visible as rises of the eccentrical element lever 12 in the side view in FIG. 25. The joint receivers can be used as bearings for the ball joints of non-illustrated support rods 7, 8 of the connecting rod 1.

Figure 30:
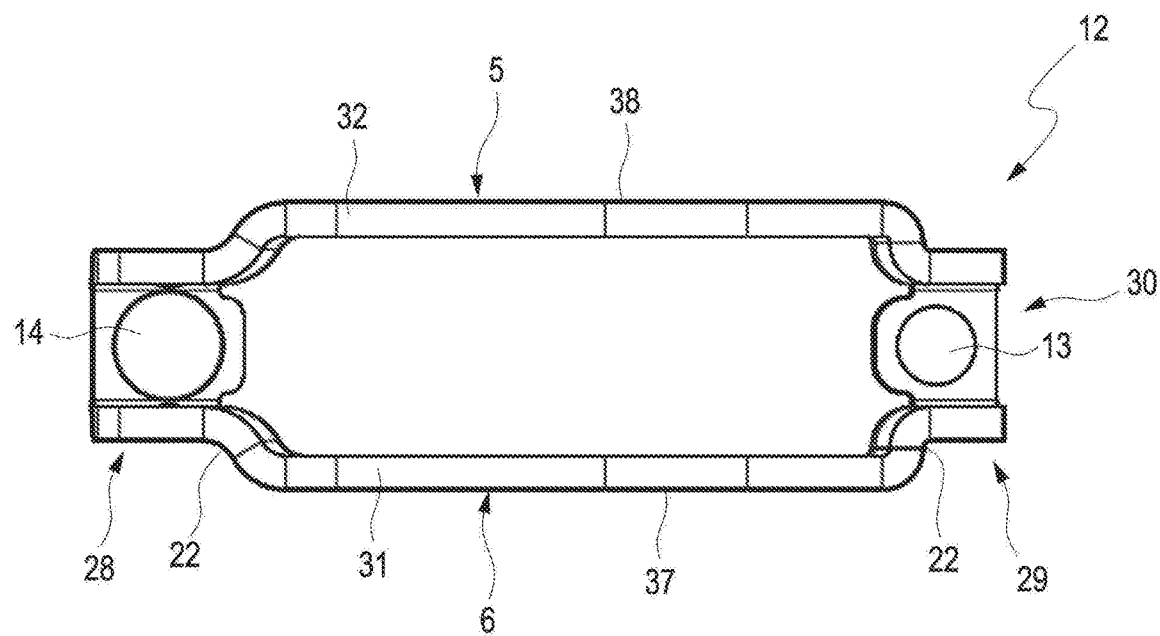
FIG. 30 illustrates a top view of a bottom side of the blank after finishing.
Figure 31:
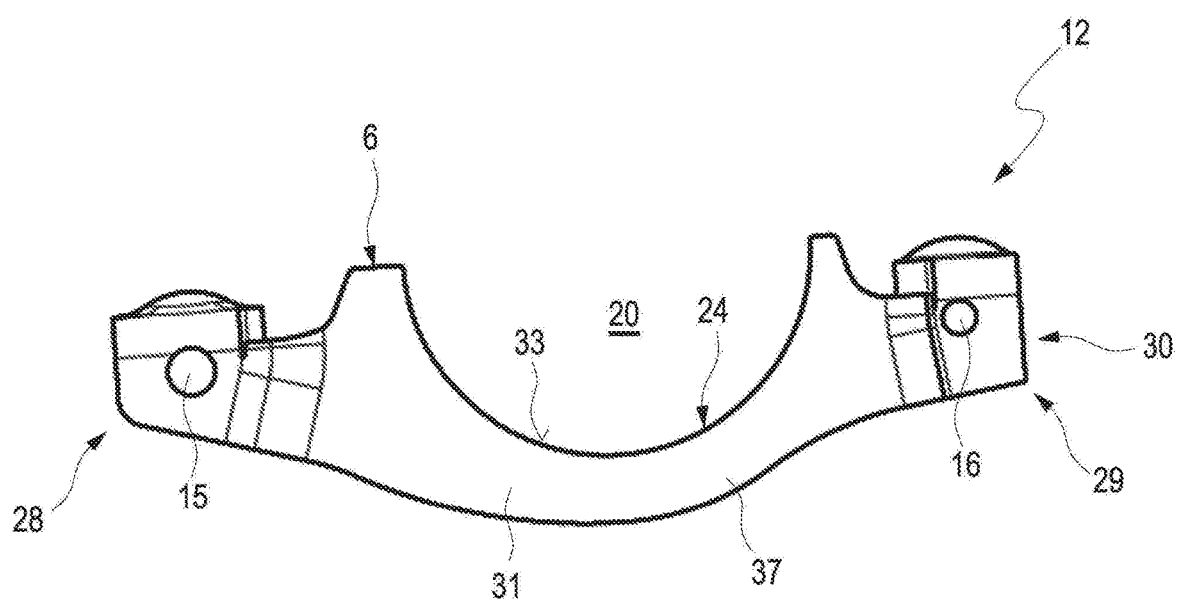
FIG. 31 illustrates a side view of the blank according to FIG. 30.
Figure 32:
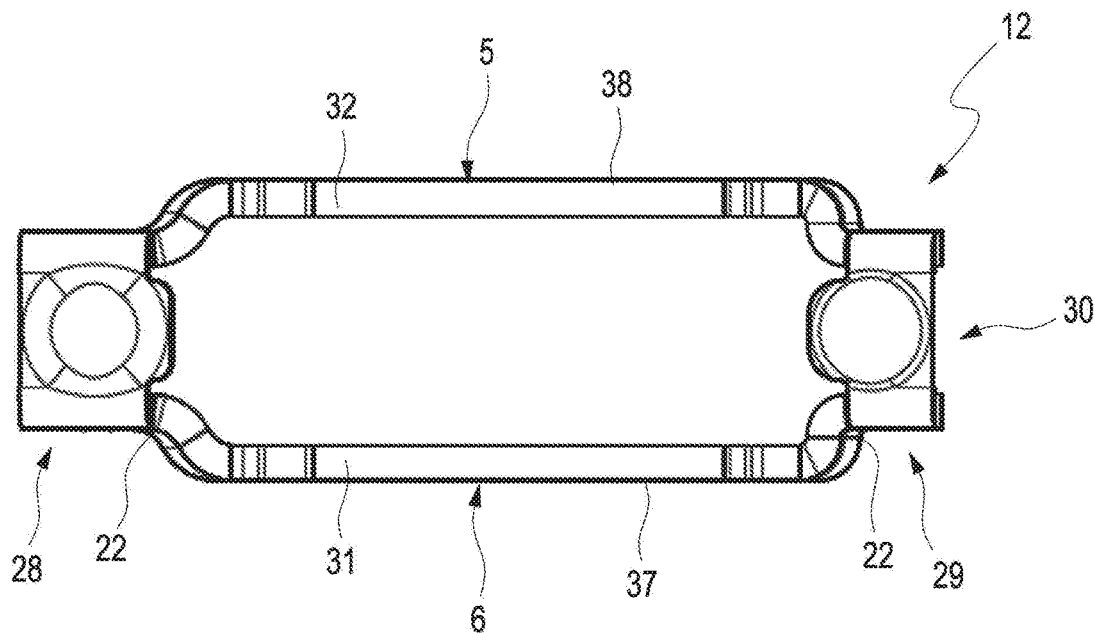
FIG. 32 illustrates a top view of the blank according to FIG. 30.
Figure 33:
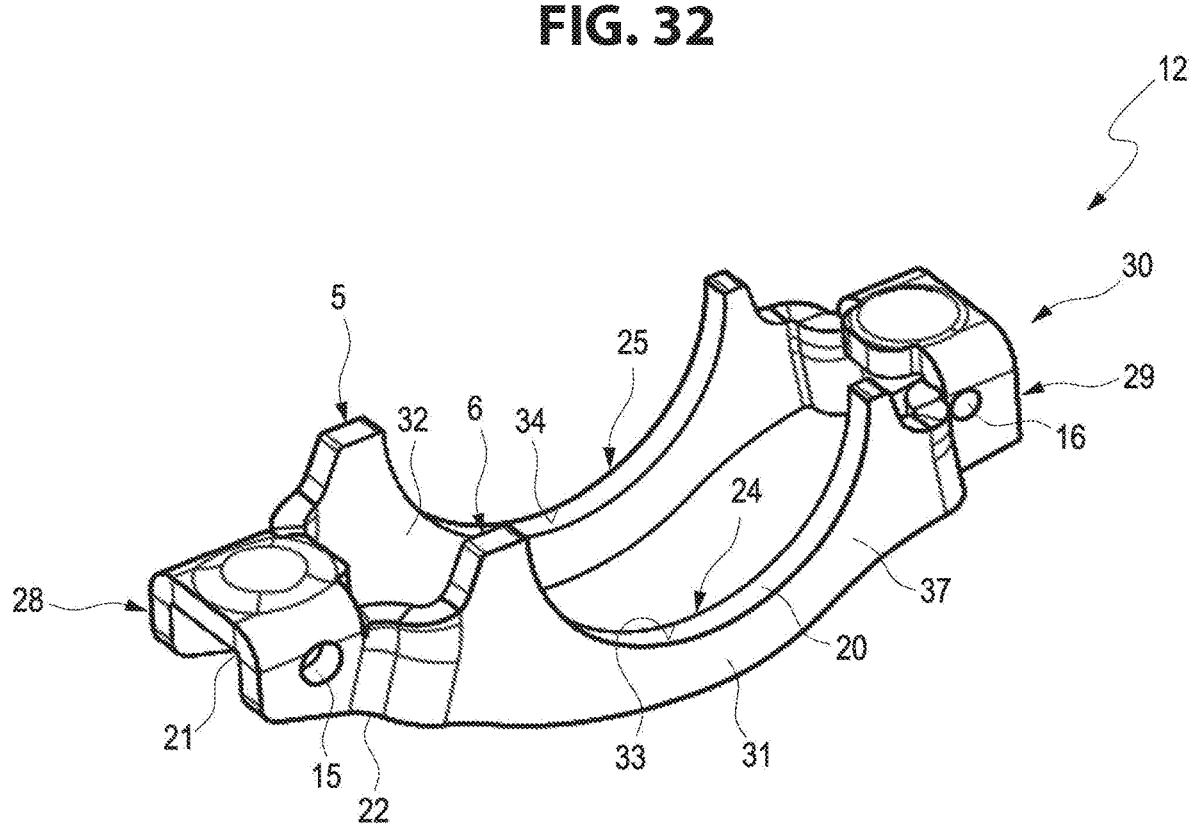
FIG. 33 illustrates an isometric view of the blank according to FIG. 30.
Figure 34:
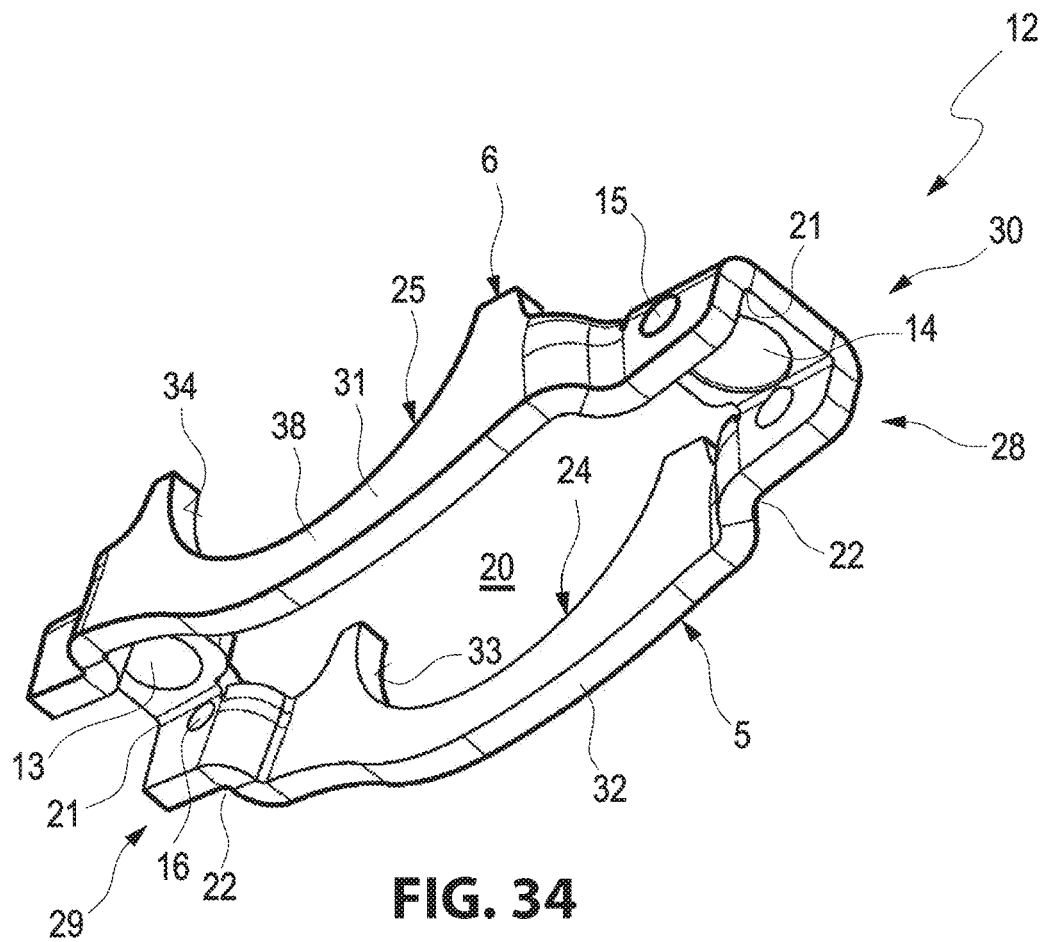
FIG. 34 illustrates an isometric view from a bottom side of the blank according to FIG. 30.
Figure 35:
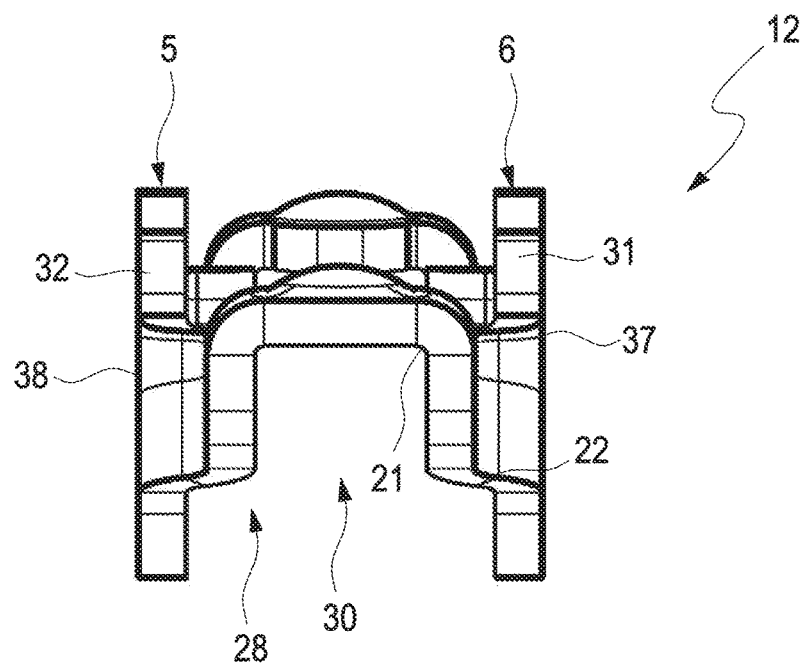
FIG. 35 illustrates a front view of the blank according to FIG. 30.

FIGS. 30-35 illustrate the finished eccentrical element lever 12 which corresponds to the embodiment illustrated in FIGS. 7-11. FIG. 30 illustrates a bottom view of the eccentrical element lever 12 according to FIG. 18 after finishing. FIGS. 31-35 illustrate various views of the eccentrical element lever 12 after finishing.

The eccentrical element lever 12 includes transversal bore holes in the portion of the joint receivers 13, 14 that are configured as openings 15, 16 for receiving loss prevention safety elements e.g. configured as safety pins. Alternatively a loss safety can also be provided in a form of a crimped or bent over lobe in the portion of the joint receiver 13, 14 which can secure a ball joint of a support rod against sliding out of the joint receiver.

What is claimed is:

1. A connecting rod for an internal combustion engine with variable compression, the connecting rod comprising:
    an eccentrical element adjustment arrangement configured to adjust an effective connecting rod length,
    wherein the eccentrical element adjustment arrangement includes an eccentrical element that cooperates with an eccentrical element lever and supports rods that engage the eccentrical element lever, and
    wherein the eccentrical element lever is integrally configured in one piece as a stamped and bent component or fabricated by a massive cold forming method,
    wherein the eccentrical element lever includes joint receivers that are engageable by ball joints of the support rods,
    wherein the joint receivers are configured as an embossing in the eccentrical element lever,
    wherein a connecting rod bearing eye and the eccentrical element include first portions with first face contours,
    wherein the eccentrical element lever envelops the eccentrical element exclusively in the first portions of the eccentrical element
    wherein the first portions of the eccentrical element are arranged on both axial sides of the eccentrical element with respect to an eccentrical element rotation axis and extend over half or less of a circumference of the eccentrical element.

2. The connecting rod according to claim 1, wherein at least a portion of the eccentrical element lever is subjected to a directional change in a forming process.

3. The connecting rod according to claim 1, wherein at least a portion of the eccentrical element lever includes at least two forming radii in planes that are arranged at a slant angle relative to each other.

4. The connecting rod according to claim 1, wherein the eccentrical element lever includes at least one loss prevention safety that secures the support rods against falling out of the eccentrical element lever.

5. The connecting rod according to claim 1, wherein the joint receivers are configured as spherical shell sections.

6. The connecting rod according to claim 1, wherein the eccentrical element lever includes recesses configured to safe weight and reduce tensions.

7. The connecting rod according to claim 1, wherein the eccentrical element lever includes connection sections that are parallel to each other and that are connected torque proof with the eccentrical element.

8. The connecting rod according to claim 7, wherein the connection sections have a cambered inner surface which is configured as a circular arc segment and which envelops the first portions.

9. The connecting rod according to claim 8, wherein the cambered inner surface includes a circular arc shaped segment that is configured at the most as a semi-circle.

10. The connecting rod according to claim 8, wherein the eccentrical element lever is welded together with the eccentrical element along the inner surface.

11. An internal combustion engine, comprising: at least one connecting rod according to claim 1.

* * * * *